United States Patent
Song et al.

(10) Patent No.: US 8,639,820 B2
(45) Date of Patent: Jan. 28, 2014

(54) WIRELESS COMMUNICATION SYSTEM FOR PERFORMING COMBINED SERVICE BETWEEN TERMINALS HAVING DIFFERENT COMMUNICATION ENVIRONMENTS

(75) Inventors: Jae-Seung Song, Seoul (KR); Kyung-Ae Yoon, Gyeonggi-Do (KR); Patrice Hédé, Saint-Germain-en-Laye (FR)

(73) Assignee: LG Electronics Inc., Seoul (KR)

( * ) Notice: Subject to any disclaimer, the term of this patent is extended or adjusted under 35 U.S.C. 154(b) by 297 days.

(21) Appl. No.: 12/226,437

(22) PCT Filed: Apr. 20, 2007

(86) PCT No.: PCT/KR2007/001943
§ 371 (c)(1),
(2), (4) Date: Dec. 1, 2009

(87) PCT Pub. No.: WO2007/123341
PCT Pub. Date: Nov. 1, 2007

(65) Prior Publication Data
US 2010/0070632 A1 Mar. 18, 2010

Related U.S. Application Data

(60) Provisional application No. 60/797,661, filed on May 5, 2006, provisional application No. 60/793,725, filed on Apr. 21, 2006.

(30) Foreign Application Priority Data

Oct. 17, 2006 (KR) .......................... 10-2006-0101072

(51) Int. Cl.
*G06F 15/16* (2006.01)
(52) U.S. Cl.
USPC ......................................................... 709/227

(58) Field of Classification Search
USPC ........................... 709/227–229; 370/351–388
See application file for complete search history.

(56) References Cited

U.S. PATENT DOCUMENTS 7,136,651 B2 * 11/2006 Kalavade ...................... 455/445
(Continued)

FOREIGN PATENT DOCUMENTS

| KR | 10-2005-0060457 A | 6/2005 |
| KR | 10-2005-0078597 A | 8/2005 |

(Continued)

OTHER PUBLICATIONS

3GPP TR 23.899 v1.2.0 (Jun. 2005), 3rd Generation Partnership Project; Technical Specification Group Services and System Aspects; Report on alternative architectures for combining CS Bearers with IMS; Release 6, pp. 1-55.

(Continued)

*Primary Examiner* — Shirley Zhang
(74) *Attorney, Agent, or Firm* — Birch, Stewart, Kolasch & Birch, LLP (57) ABSTRACT

A method for transmitting information in a wireless communication system and a wireless communication terminal supporting the method, wherein when an application server sends to a receiving terminal a specific message for checking radio environment information or a message including a radio environment capability, the receiving terminal having received the message may send a response message with its own radio environment information to the application server, such that the radio environment information related to the receiving terminal can be sent to the sending terminal after analyzed by the application server.

14 Claims, 4 Drawing Sheets

(56) References Cited

U.S. PATENT DOCUMENTS

| | | | |
|---|---|---|---|
| 7,206,582 B2* | 4/2007 | Tom et al. | 455/445 |
| 7,450,565 B2* | 11/2008 | Suotula et al. | 370/352 |
| 2003/0185232 A1* | 10/2003 | Moore et al. | 370/465 |
| 2004/0187021 A1 | 9/2004 | Rasanen | |
| 2004/0242227 A1 | 12/2004 | Huotari et al. | |
| 2004/0249887 A1* | 12/2004 | Garcia-Martin et al. | 709/204 |
| 2006/0105766 A1* | 5/2006 | Azada et al. | 455/432.1 |
| 2006/0218291 A1* | 9/2006 | Zhu et al. | 709/229 |
| 2006/0276193 A1* | 12/2006 | Itzkovitz et al. | 455/445 |
| 2007/0036143 A1* | 2/2007 | Alt et al. | 370/352 |
| 2007/0195754 A1* | 8/2007 | Shaheen | 370/352 |
| 2007/0274289 A1* | 11/2007 | Buckley et al. | 370/351 |
| 2008/0075067 A1* | 3/2008 | Guglielmi et al. | 370/352 |
| 2008/0287104 A1* | 11/2008 | Sundberg et al. | 455/412.1 |

FOREIGN PATENT DOCUMENTS

| | | |
|---|---|---|
| KR | 10-2006-0104896 A | 10/2006 |
| KR | 10-2006-0113284 A | 11/2006 |
| WO | WO 2006/010613 A1 | 2/2006 |
| WO | WO 2006/020741 A | 2/2006 |

OTHER PUBLICATIONS

3GPP TSG SA WG2 Architecture—S2# 54, Aug. 28-Sep. 1, 2006, "CSI Interworking for IMS unregistered CSI capable UE," LG Electronics, S2-062882.

3GPP TS 23.279 V7.2.0 (Mar. 2006), "3rd Generation Partnership Project; Technical Specification Group Services and System Aspects; Combining Circuit Switched (CS) and IP Multimedia Subsystem (IMS) services; Stage 2 (Release 7)", No. V7.2.0, Mar. 1, 2006, XP050363548.

Huawei, "DISC, Capabilities Exchange in Case of the IMS Session Created First", 3rd Generation Partnership Project, vol. SA WG2, Feb. 11, 2005, XP050251828.

Nortel Networks, "CSI: Radio Capability Exchange in SIP", 3GPP TSG-CN1 Meeting #37, vol. CN WG1, Feb. 4, 2005, XP050071840.

Nortel Networks, "CSI: Radio Capability Exchange Mechanism Considerations", 3rd Generation Partnership Project, vol. SA WG2, Feb. 11, 2005, XP050251861.

3GPP TS 23.279 V2.0.0 (May 2005), 3rd Generation Partnership Project; Technical Specification Group Services and System Aspects; Combining CS and IMS services; Stage 2; (Release 7).

"Voice Call Continuity between IMS and Circuit Switched Systems," TSG-X (MMD) X.P0042-0 v0.3 (Jul. 23, 2007), 3GPP2.

* cited by examiner

Fig. 1

– – – IMS session (other)
——— CS call (for voice)

WIRELESS COMMUNICATION SYSTEM FOR PERFORMING COMBINED SERVICE BETWEEN TERMINALS HAVING DIFFERENT COMMUNICATION ENVIRONMENTS

DISCLOSURE OF INVENTION

Technical Solution

This disclosure relates to a wireless (radio) communication system, to a method for efficiently transmitting information between different terminals, and a wireless communication terminal supporting the method.

In general, Combination of CS and IMS services (CSI) is a technique for providing a desired service between two users by combining a Circuit-Switched (CS) service and an Instant Messaging Service (IMS) service. Here, procedures defined in the existing specification may be employed for a CS call setup and an IMS session setup.

In the CSI, CSI UE denotes a terminal capable of supporting both a CS service and a Packet-Switched (PS) service at the same time. The CSI UE performs communications through a CS bearer for a voice component, while performing communications through an IMS bearer via a PS for various IMS services (e.g., messaging, white board, etc.).

CSI AS is an application server which handles voice sessions of the CSI. When an INVITE message contains voice related session information, the CSI AS has a function of transmitting the corresponding session to a specific domain (CS or PS). If the session contains other types of information in addition to the voice, the CSI AS should be capable of performing segregation and concatenation for the session.

Figure 1:
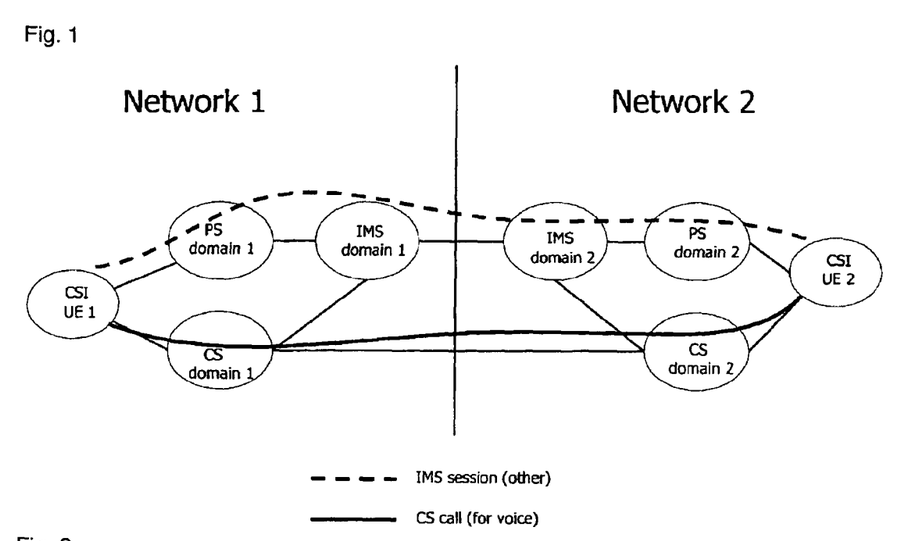
FIG. 1 is a conceptual view illustrating a basic session setup between CSI UEs.

FIG. 1 illustrates a basic session setup between CSI UEs.

FIG. 1 illustrates how a session for a combined session (i.e., voice component+IMS session) is established on a core network in case where both originating and terminating terminals are CSI UEs.

When a CSI UE 1 establishes (sets) a combined session in which a non-real-time IMS session is combined with voice, message, and the like, a CS call for the voice component and an IMS session for the non-real-time IMS service are separately initiated. If a terminating side terminal is also a CSI UE (i.e., CSI UE 2), the CS call for the voice component is connected to the CS domain (e.g., CS domain 1 and CS domain 2), while the IMS session is connected to an IMS domain (e.g., IMS domain 1 and IMS domain 2).

However, in order to simultaneously perform the CS and PS services in the CSI, both CSI UE and radio coverage should support a MultiRAB/DTM.

That is, the CSI UE can simultaneously perform the CS and PS services currently provided in the CSI only when the CSI UE is under the coverage of the MultiRAB/DTM. Therefore, the CSI allows CSI UEs to exchange radio environment capabilities with each other upon establishing a CS call, thereby checking whether the CS and PS can simultaneously be performed. Through this call setup process, if it is checked that each radio environment of the CSI UEs is under the MultiRAB/DTM environment which simultaneously supports both the CS and PS, the CSI UE can perform a procedure of initiating a multimedia session.

Figure 2:
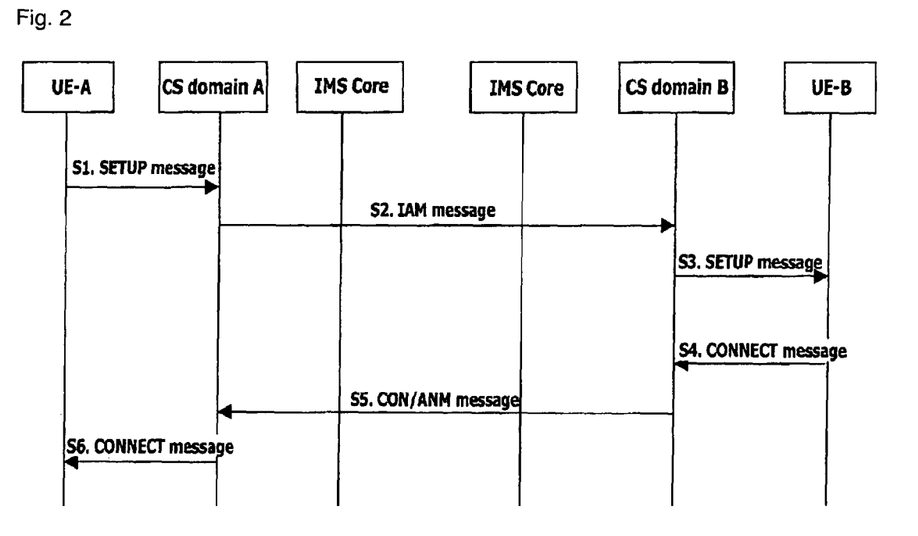
FIG. 2 is a view illustrating a radio environment information exchange procedure between CSI UEs upon establishing a CS call.

FIG. 2 illustrates a radio environment information exchange procedure between CSI UEs upon establishing a CS call.

As illustrated in FIG. 2, first, a UE A sends a SETUP message including the current radio environment information encoded in a user-user signaling IE to a CS domain A of an originating network, thus to initiate a CS call (S1).

After receiving the SETUP message, the CS domain A of the originating network sends an IAM message including the current radio environment information on the UE A toward the CS domain B of a terminating network (S2). The CS domain B of the terminating network then forwards the IAM message to a UE B (S3).

The UE B stores the current radio environment information on the UE A included in the IAM message, and detects based upon the corresponding radio environment information whether the UE A is under the coverage of the MultiRAB/DTM (simultaneously supporting both CS and PS services). Also, the UE B may take the stored current radio environment information of the UE A in account when deciding what service options to present to a user and/or whether to initiate a UE capability information exchange.

If it is detected based upon the current radio environment information on the UE A that the UE A is under the coverage of the multiRAB/DTM (simultaneously supporting both CS and PS services), the UE B sends the final response, for example, a CONNECT message by including its current radio environment information therein, with respect to the SETUP message (S4).

The CS domain B of the terminating network having received the CONNECT message sends an ANM or CON message including the current radio environment information on the UE B toward the CS domain A of the originating network (S5).

The CS domain A of the originating network having received the ANM or CON message sends the CONNECT message including the current radio environment information on the UE B to the UE A (S6). Accordingly, the UE A and the UE B can smoothly perform the IMS session setup procedure.

Thus, upon the communication between the CSI terminals, the radio environments of the counterpart terminals can be exchanged upon establishing the CS call, thereby smoothly performing the IMS session setup procedure.

However, upon the communication among plural terminals (different types of terminals), for example, upon the communication between a CSI UE and an IMS UE, capability (e.g., radio environment) information exchange is not supported. As a result, a combinational service between the two terminals (i.e., CSI UE and IMS UE) may not smoothly be performed. That is, the IMS UE may not transmit the current radio environment information (i.e., capability information) at the session setup procedure. In this case, the CSI UE may not transmit its radio environment to the IMS UE (counterpart terminal) because the IMS UE does not perform the capability exchange procedure.

Therefore, when the IMS UE intends to sequentially provide a voice service and a multimedia service, the IMS UE can not recognize whether the corresponding services are supported by the CSI UE. Accordingly, the IMS UE may not attempt to perform an additional communication with the CSI UE or may request an unnecessary service from the CSI UE.

Figure 3:
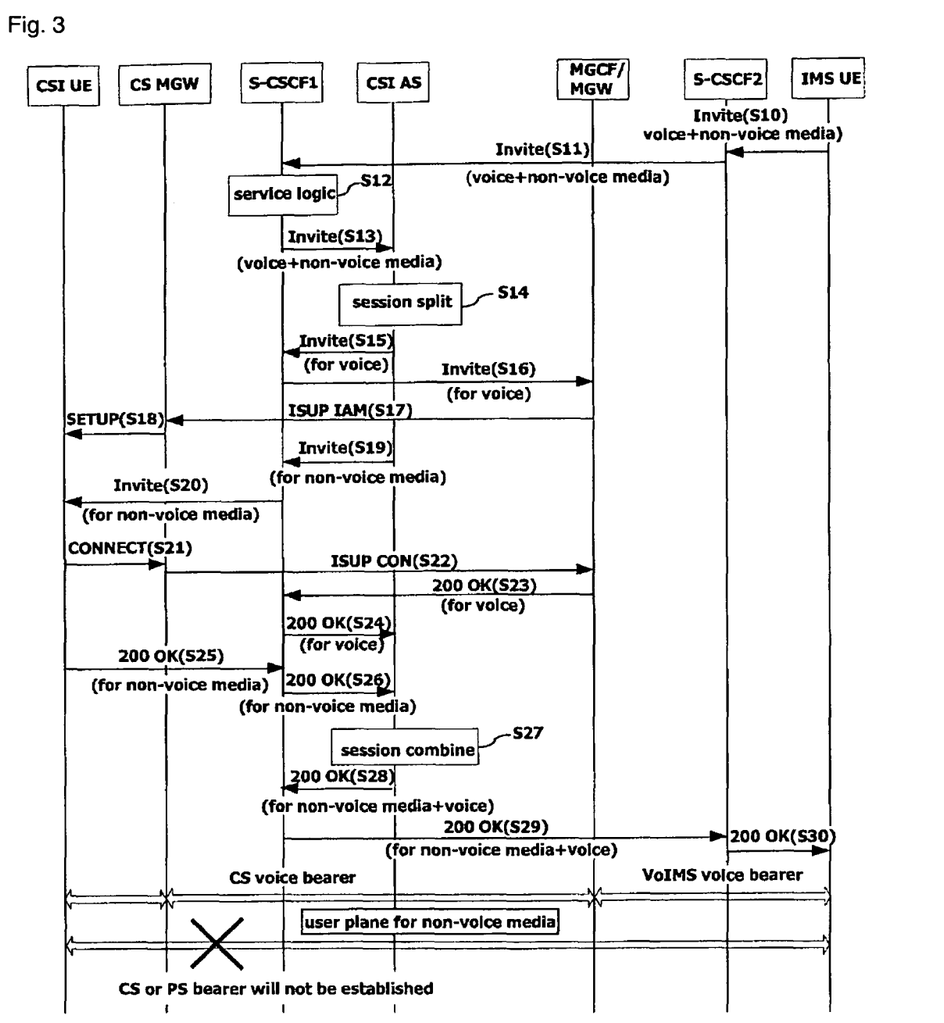
FIG. 3 is a signal flowchart illustrating a process for setting call and session between different types of terminals.

FIG. 3 illustrates a process of establishing call and session between different types of terminals.

As illustrated in FIG. 3, for voice and non-voice media communications with the CSI UE, the IMS UE sends an INVITE message for establishing a session including the information related to the voice and non-voice media to an IMS core to which the IMS UE belongs (S10). A S-CSCF2 of the IMS core forwards the INVITE message to a S-CSCF1 of the IMS core to which the CSI UE belongs according to an IMS session setup procedure (S11). Here, the IMS UE indicates a terminal which does not support a Circuit-Switched (CS) service and performs every service through an IMS domain. That is, the IMS UE performs communications even with respect to a voice component through a VoIMS service of the IMS domain.

The S-CSCF1 performs a service logic to authenticate a terminating UE (i.e., CSI UE) (S12). The S-CSCF1 then routes the INVITE message to a CSI AS with reference to muting information read from a HSS (not shown) (S13).

The CSI AS performs a session split with respect to the INVITE message (S14). Accordingly, the CSI AS sends a voice component to a CS domain of the CSI UE and sends a non-voice multimedia component to the IMS domain, thereby requesting a CS call setup or an IMS session setup.

That is, the CSI AS sends the INVITE message including the voice component to a MGCF/MGW of the IMS core via the S-CSCF1 (S15 and S16). The MGCF/MGW maps the INVITE message (i.e., a SIP (session initiation protocol) message) to an ISUP IAM message, thus to forward the ISUP IAM message to a CS MGW (i.e., the CS domain) of the CSI UE (S17). The CS MGW sends a SETUP message to the CSI UE to request the CS call setup (S18). Also, the CSI AS sends the INVITE message including the non-voice multimedia component to the CSI UE via the S-CSCF1, to request the IMS session setup (S19 and S20).

Accordingly, the CSI UE respectively sends response messages to the CSI AS with respect to the CS call setup and the IMS session setup. The CSI AS receives the response messages with respect to the requests for the voice component and the non-voice component from the CSI domain and the IMS domain, respectively, and thereafter performs a session combine.

That is, the response message (e.g., CONNECT) with respect to the request for the voice component outputted from the CSI UE is converted into an ISUP CON message at the CS MGW so as to be sent to the MGCF/MGW (S21 and S22). A 200 OK converted from the ISUP CON message at the MGCF/MGW is inputted to the CSI AS via the S-CSCF1 (S23 and S24). In addition, the response message (e.g., 200 OK) with respect to the request for the non-voice multimedia component outputted from the CSI UE is directly inputted to the CSI AS via the S-CSCF1 (S25 and S26).

Therefore, the CSI AS receives the response messages with respect to the voice component and non-voice multimedia component, thus to perform the session combine (S27). The CSI AS then forwards the response message (e.g., 200 OK) for the combined session is sent to the IMS UE, namely, the originating UE, via the S-CSCF1 and S-CSCF2 (S28~S30).

Afterwards, the CSI UE and the IMS UE generate (establish) bearers for an actual data transmission based upon a session negotiation. However, if the CSI UE (i.e., the terminating terminal) is not under the coverage of the MultiRAB/DTM, even if the response message outputted from the CSI UE includes permissions for all media included in the session, the CS bearer may only be established, or the IMS bearer may only be generated via the PS.

As such, upon the communications between different types of terminals, since a radio environment information exchange is not supported, the combined service may not smoothly be performed between two different terminals. As a result, when the IMS UE wants to provide a multimedia service after providing a voce service, it can not know whether the CSI UE supports the corresponding multimedia service, the IMS UE can not perform an additional communication, or request an unnecessary service from the CSI UE.

That is, from the perspective of the IMS UE, when VoIP is set, no information is provided as to whether its counterpart terminal is a CS UE, a CSI UE or an IMS UE, the IMS UE may not easily attempt to perform an additional communication. Even if the communication is additionally attempted toward the counterpart terminal, the attempt may be made without exact radio environment information related to the counterpart terminal, thereby increasing probability of communication failure much more.

Furthermore, from the perspective of the CSI UE, when the VoIP is opened, communications toward the CS domain are performed by a PSTN interworking. Accordingly, a voice service may only be used without any information as to whether the counterpart UE is a CS UE or an IMS UE. If the counterpart UE is either a CSI UE or an IMS UE, the CSI UE can additionally use a multimedia service while using the voice service. In spite of that, however, the CSI UE may not attempt to perform any communication for any service due to the lack of information on an exact radio environment of the counterpart UE.

Therefore, this disclosure is to provide a method for transmitting information in a wireless communication system capable of increasing satisfaction of multimedia communications by allowing a radio environment information exchange between a CSI terminal and an IMS terminal, and a wireless communication terminal supporting the method.

This disclosure is also to provide a method for transmitting information in a wireless communication system capable of supporting an efficient communication by additionally providing information on usable services after setting an initial communication among multiple terminals.

In this disclosure, there is provided a method for transmitting information in a wireless communication system comprising: sending, by an application server, a request message including a radio environment capability to a second terminal when receiving the corresponding request message for a session setup from a first terminal; checking, by the second terminal, whether the message sent by the application server includes the radio environment capability; and sending, by the second terminal, a response message including its own radio environment information to the application server if the message from the application server includes the radio environment capability depending on the checked result.

Preferably, the first and second terminals are different types of terminals, wherein if the first terminal is an IMS terminal, the second terminal is a CSI terminal, or vice versa.

Preferably, the request message is an INVITE message.

Preferably, the radio environment capability is a radio environment header, which includes a field indicating whether the first terminal supports a radio MultiRAB/DTM.

Preferably, the application server is a CSI AS.

Preferably, in one embodiment, the CSI AS forwards the radio environment capability by adding the radio environment header to the INVITE message.

Preferably, in another embodiment, the CSI AS includes UUS signaling information in a SIP body within the INVITE message, and forwards the radio environment capability by including indication information in the SIP header, the indication information informing that the UUS signaling information is included in the SIP body.

Preferably, the request message is converted into an ISUP message at a MGCF for transmission. The response message outputted from the second terminal is converted into a SIP message at the MGCF.

Preferably, the response message is a CONNECT message.

The method for transmitting information in a wireless communication system may further comprise analyzing, by the application server, the radio environment information on the second terminal to send the analyzed radio environment information to the first terminal.

Preferably, the application server converts (modifies) the response message using a warning message when the second terminal does not support the MultiRAB/DTM.

Preferably, the first terminal performs a multimedia communication with the second terminal when it is checked that the second terminal supports the MultiRAB/DTM based upon information received from the application server.

In this disclosure, a method for transmitting information in a wireless communication system may comprise: requesting, by a first terminal, a session setup from an application server by sending a request message; sending a specific message from the application server having received the request message to a second terminal in order to recognize radio environment information; sending, by the second terminal, a response message including its own radio environment information to the application server when the specific message is received; and sending, by the application server, the radio environment information to the first terminal after analyzing the response message.

Preferably, the specific message is an OPTIONS request message.

Preferably, the first and second terminals are different types of terminals, wherein if the first terminal is an IMS terminal, the second terminal is a CSI terminal, or vise versa.

Preferably, the request message is an INVITE message. The application server is a CSI AS.

Preferably, the first terminal performs a multimedia communication with the second terminal when the second terminal supports a MultiRAB/DTM.

In this disclosure, in a radio communication between terminals having different communication environments, a wireless communication terminal in which a message sent by an application server according to a session setup request of a sending terminal is received, and a response message including radio environment information on a receiving terminal is sent to the application server in case where the message from the application server includes a radio environment capability.

Preferably, the message is an INVITE or SETUP message.

Preferably, the sending and receiving terminals are different types of terminals, wherein if the sending terminal is an IMS terminal, the receiving terminal is a CSI terminal, or vise versa.

Preferably, the radio environment capability is a radio environment header, and includes a field indicating whether the first terminal supports a radio MultiRAB/DTM.

Preferably, the application server is a CSI AS, and the CSI AS forwards the radio environment capability by adding the radio environment header to the INVITE message.

Hereinafter, exemplary embodiments of this disclosure will be explained in detail as follows.

In general, different types of terminals (e.g., CS UE, CSI UE and IMS UE) have different communication environments. Supportable services may depend on various environments, or constraints on communications may be generated according to the various environments.

For example, a CSI UE simultaneously supports Circuit-Switched (CS) service and Packet-Switched (PS) service only under the coverage of a MultiRAB/DTM. The IMS UE can establish and control several sessions and bearers under a packet-based environment, but may use different services based upon a user's service registration. In addition, supportable services may be varied according to radio interfaces supporting communications and construction of a core network. Types of usable services may be restricted according to with whom the communication is performed.

Recently, when a communication is connected between end terminals (e.g., an originating terminal and a terminating terminal), information related to the connected communication can only be known. However, besides the information of the connected communication, such additional information as information related to a radio environment which the terminating terminal expose to, information with respect to which terminal the terminating terminal is now communicating with, and the like, are not exchanged between the terminals for the communication. Accordingly, which services can additionally be used may not be recognized.

Therefore, this disclosure proposes a method for allowing a combined service to be smoothly performed by exchanging information between two terminals after an initial communication (e.g., voice communication or multimedia communication) is connected among various or different types of terminals. That is, this disclosure proposes a method for exchanging information between CSI UE and IMS UE, in order to support communications for one or more components (e.g., voice component or non-voice multimedia component) between the CSI UE and the IMS UE.

Here, information exchanged between the two terminals (i.e., CSI UE and IMS UE) may be described as follows.
 IMS registration information
 Radio environment information such as MultiRAB/DTM
 Information on available services
 CS Registration information
 User preference service information
 Information related to other useable services These information can be exchanged by the following signaling after an initial communication is set.
 CS signaling
 PS signaling (including IMS)
 Mutual mapping signaling in case of CS/PS interworking Therefore, in this disclosure, the aforementioned information can be provided according to various network environments or according to counterpart UEs as follows.
 1. Communication Between IMS UE and CS UE
 Multimedia capability supportable by CS UE
 Radio environment information on CS UE
 Capability information such as MultiRAB/DTM supportable CS UE
 Registration status information on IMS UE
 Useable service list of IMS UE
 IMS UE capability information
 IMS UE capability version information
 2. Communication Between IMS UE and CSI UE
 Registration status information on IMS UE
 useable service list of IMS UE
 IMS UE capability information
 IMS UE capability version information
 IMS UE notification information CSI UE capability version information
Radio environment information on CSI UE
IMS registration status information on CSI UE
CSI UE capability information
Useable service list of CSI UE
CSI capable notification
CS status information on CSI UE
3. Communication Between IMS UE and IMS UE
Useable IMS service information
Preference service information on counterpart UE
Capability version information Here, CSI AS, MGCF and the like may exist between the IMS UE and the CSI UE to thus allow a smooth communication between the IMS UE and the CSI UE. In addition, upon the interworking between the signaling in an IMS domain (i.e., SIP) and the signaling in a CS domain (i.e., ISUP), the aforementioned information may be included and exchanged. Therefore, a contents for a related header or body should be added to the IMS regarding the aforementioned information. Also, a parameter of an ISUP message which can be mapped to the SIP should be newly defined or an existing parameter thereof should be able to be used. When using this method, an IMS registration state of a counterpart UE, current radio environment and capability, a supportable capability and capability version and other available services can be recognized based upon information exchanged in a state of VoIP or typical multimedia being set.

That is, upon a VoIP connection, a communication on the CS domain may be performed by a PSTN interworking. Accordingly, the CSI UE can only use a simple voice service without any information as to whether another UE is a CS UE or an IMS UE. If the counterpart UE is either a CSI UE or an IMS UE, the CSI UE can additionally use a multimedia service while using the voice service. In spite of that, however, the CSI UE may not even attempt to perform any communication for any service due to the lack of such information. Also, since the IMS UE can not recognize whether its counterpart UE is CSI UE, CS UE or IMS UE, the IMS UE may not perform an additional communication. Even if any communication is additionally attempted, the attempt may be made without exact radio environment information related to the counterpart UE, resulting in a much more increase in probability of communication failure.

Therefore, this disclosure may allow in a communication between an IMS UE and a CSI UE that they can exchange and use various useable information upon their initial communication by adding an interworking function and a mapping function.

Methods for transmitting multimedia information in a wireless communication system according to the present invention may be classified according to upon setting (establishing) an IMS service session and upon setting a CS call.

First, a method for transmitting information in a wireless communication system upon setting an IMS service session may denote a method in which when an IMS UE sends a session setup INVITE message, a CSI AS may recognize information related to a CSI UE to inform to the IMS UE, which is performed by the following two schemes.

According to a first scheme, the CSI AS may recognize radio environment information related to the CSI UE by converting a SIP message into an ISUP message, and thereafter may inform the IMS UE of the recognized radio environment information on the CSI UE. The radio environment information may be included in a header or body of a SIP message which is sent from the CSI AS to PS and CS domains of the CSI UE.

In the first scheme, the CSI AS converts (maps, changes, etc.) a SIP request received from the IMS UE and then includes radio environment information related to SIP capability in the converted SIP request. The CSI AS may forward the information included SIP request to the CSI UE. Here, the SIP request (message) may be sent by being converted into an ISUP message used in a PSTN (or vice-versa).

If the radio environment information is included in the ISUP message, the CSI UE may include its radio environment information in the ISUP message for response. The ISUP message may be re-converted into the SIP response message by a SIP-ISUP mapping, to be sent to the CSI AS. Therefore, the CSI AS may analyze the received SIP response message, and then may send the IMS UE the radio environment information related to the CSI UE in a manner of sending a warning message, or the like.

According to a second scheme, the CSI AS may recognize radio environment information related to the CSI UE by exchanging OPTIONS between the CSI AS and the CSI UE, so as to inform the IMS UE of the recognized radio environment information on the CSI UE.

In the second scheme, the CSI AS may send a separate OPTIONS request to the CSI UE in order to recognize the radio environment information related to the CSI UE. The CSI UE may forward its capability and radio environment information to the CSI AS in response to the OPTIONS request. The CSI AS then may analyze the response message received from the CSI UE, to thereby forward the radio environment information related to the CSI UE to the IMS UE in the manner of using a warning message, or the like.

A method for transmitting information in a wireless communication system upon setting a CS call may be a method in which a CSI UE includes its own information in a SETUP message or an INVITE message to inform to an IMS UE.

Preferably, the SETUP message may be sent when the CSI UE has set a voice communication at the beginning, while the INVITE message (or OPTIONS message) may be sent when the CSI UE has set a multimedia communication at the beginning.

Preferably, the sent information may include CSI UE related radio environment information (e.g., MultiRAB/DTM cell, GPRS network, UTRAN network, etc.), CSI UE related capability information (e.g., information as to whether only GPRS can support, only CS can support, DTM can support, or MultiRAB/DTM can support), CSI UE related IMS registration information, available service list of CSI UE (e.g., PoC, a service list of video calls, etc.), CSI capable notification (i.e., information as to whether a current terminal may be a CSI capable terminal), capability version information, and the like.

Figure 4:
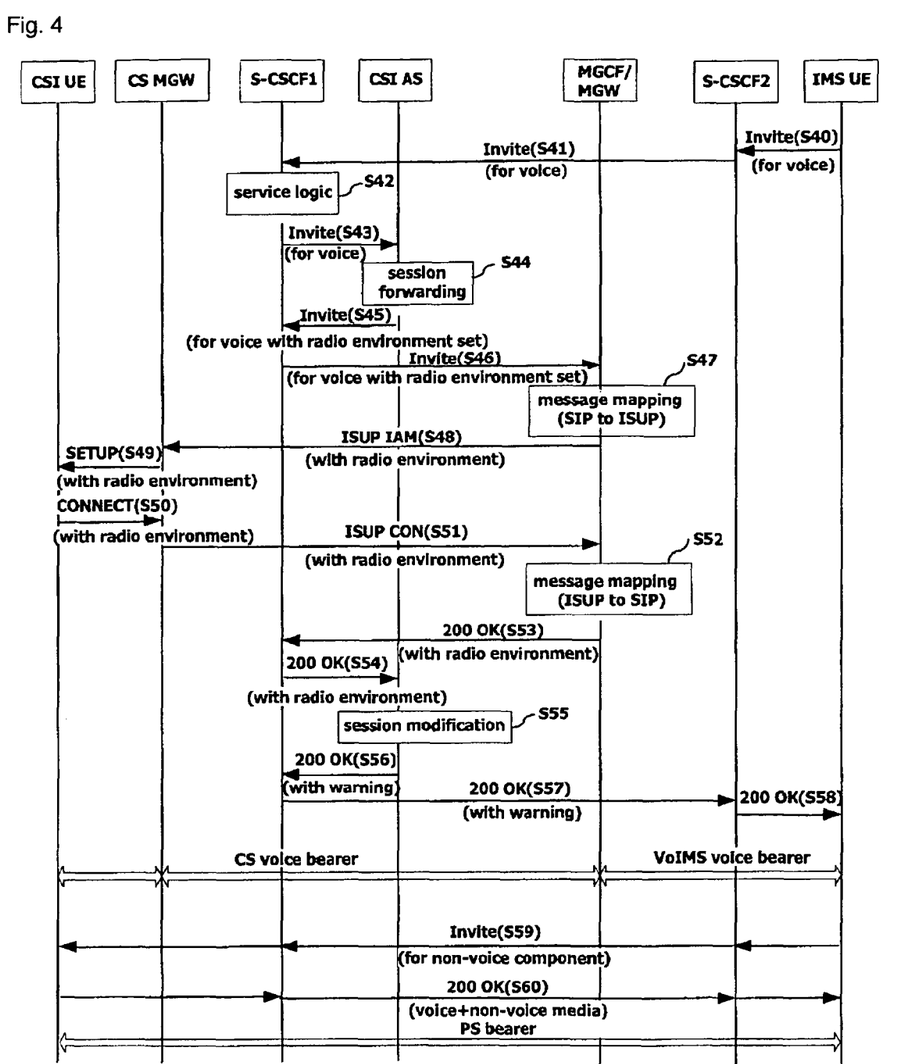
FIG. 4 is a signal flowchart illustrating a first embodiment of a method for transmitting multimedia information in a wireless communication system according to the present invention.

FIG. 4 illustrates a first embodiment of a method for transmitting multimedia information in a wireless communication system according to the present invention, which illustrates a method for recognizing a radio environment of a CSI UE by converting (mapping, changing, etc.) a SIP message into an ISUP message when setting an IMS service session.

As illustrated in FIG. 4, an IMS UE may send an INVITE message to a S-CSCF2 of an IMS core to which the IMS UE belongs, thereby requesting a session setup for connecting a SIP-based voice service with a CSI UE (i.e., terminating UE) (S40). The S-CSCF2 may forward the INVITE message to a S-CSCF1 of the IMS core to which the CSI UE belongs according to an IMS session setup procedure (S41).

After receiving the INVITE message, the S-CSCF1 may perform a service logic to authenticate the CSI UE (i.e., the terminating UE) (S42), and then may forward the INVITE message to the CSI AS with reference to routing information read from a HSS (not shown) (S43).

may forward its radio environment via a UUS of a CS SETUP signaling when a received SETUP message includes the corresponding radio environment information.

Accordingly, in one embodiment, for receiving the radio environment information from the CSI UE, the CSI AS may add the radio environment header to the INVITE message, and then may send the header added INVITE message to the CS domain. The following [Table 1] shows an exemplary INVITE message to be forwarded to the CS domain by the CSI AS.

Table 1
[Table 1]

TABLE

SIP/2.0 200 OK Via: SIP/
2.0/UDPpcscf2.visited2.net:5088;comp=sigcomp;branch=z9hG4bK361k21.1, SIP/
2.0/UDP scscf2.home2.net;branch=z9hG4bK764z87.1, SIP/2.0/UDP
icscf2_s.home2.net;branch=z9hG4bK871y12.1, SIP/2.0/UDP
scscf1.home1.net;branch=z9hG4bK332b23.1, SIP/2.0/UDP
pcscf1.visited1.net;branch=z9hG4bK240f34.1, SIP/2.0/UDP [5555::aaa:bbb:ccc:ddd]
:1357;comp=sigcomp;branch=z9hG4bKnashds7Record-Route:
<sip:pcscf2.visited2.net:5088;lr;comp=sigcomp>>, <sip:scscf2.home2.net;lr>,
<sip:scscf1.home1.net;lr>, <sip:pcscf1.visited1.net;lr>Privacy: noneP-
Access-Network-Info: 3GPP-UTRAN-TDD; utran-
cell-id-3gpp=234151D0FCE11From: <sip:user1_public1 @home1.net>;
tag=171828To: <tel:+12125552222>;tag=314159Call-ID:
cb03a0s09a2sdfglkj490333Cseq: 127 INVITEContact: <sip:[5555::eee:fff:aaa:bbb]
:8805;comp=sigcomp>;+g.3gpp.cs-voiceAllow: INVITE, ACK, CANCEL, BYE,
PRACK, UPDATE, REFER, MESSAGE, OPTIONSServer: PMI-0EA2, Radio-
Environment : capability of IMS UEContent-Type: application/sdpContent-Length:
(...)v=0o=– 2987933615 2987933617 IN IP6 5555:: eee:fff:aaa:bbbs=-c=IN IP6
5555::eee:fff:aaa:bbbt= 0 0m=voice 3402 TCP/MSRP *a=accept-types:text/plain text/html
message/cpima=path:msrp://[5555::eee:fff:aaa:bbb]
:3402/s234167;tcpa=max-size:65536

The CSI AS having received the INVITE message either may split or forward a session according to a media type included in the INVITE message. For example, if the INVITE message includes a voice component and a non-voice multimedia component, the CSI AS may perform a session split such that the CSI AS sends the voice component to a CS domain of the CSI UE and sends the non-voice multimedia component to an IMS domain.

On the other hand, if the INVITE message includes any one of the voice component and the non-voice multimedia component, the CSI AS may send the voice component to the CS domain of the CSI UE or may send the non-voice multimedia component to the IMS domain. Here, the CSI AS may add a radio environment related header to the INVITE message (i.e., a SIP message) and may send the header-added message to the CS and/or IMS domain(s). This is because a radio environment field should be included in a request message in order for the CSI UE to add its radio environment information to a response message. FIG. 4 illustrates an example in which the INVITE message only includes the voice component. Accordingly, the CSI AS may determine that the radio environment related header is added to the INVITE message including the voice component, to be then sent to the CS domain of the CSI UE.

The CSI UE can simultaneously perform CS and PS services under the coverage of a MultiRAB/DTM. Accordingly, in order to perform communication for additional multimedia data, the CSI UE should be under the coverage of the MultiRAB/DTM, and such environment-related information should be forwarded to the IMS UE. However, the CSI UE For example, the radio environment header indicates capability of the IMS UE, and may be set to CUV-001 or CUV-000. The CUV-001 may indicate that the CSI UE is under the coverage of the MultiRAB/DTM (i.e., simultaneously supporting PS and CS), and the CUV-000 may indicate that the CSI UE is not under the coverage of the MultiRAB/DTM (i.e., optionally supporting PS or CS).

The INVITE message sent by the CSI AS may be forwarded to a MGCF via a S-CSCF1 in order to be changed (converted) into a protocol of the CS domain (S45 and S46). The MGCF may map the received INVITE message (i.e., SIP message) into an ISUP IAM message of the CS domain (S47). During this process, each header of the INVITE message is changed (converted) into a parameter of the ISUP IAM message. The following [Table 2] may show an example of the mapping between the INVITE message and the ISUP IAM message.

Table 2
[Table 2]

TABLE

| ISUP parameters | SIP header |
| --- | --- |
| Accept transport | SIP URL |
| Automatic congestion level | No parameter but suggested to extend SIP by allowing a warning header |
| Call reference | Call1-ID |
| Called party number | To |
| Calling party number | From |

In another embodiment, the CSI AS may include UUS signaling information in a SIP body within the INVITE message. The CSI AS also may include indication information, which indicates the inclusion of the UUS signaling information in the SIP body, into a SIP header. The CSI AS accordingly may send the INVITE message including the UUS signaling information and the indication information to a MGCF/MGW. The MGCF/MGW may convert the received INVITE message into an ISUP message. Here, the INS signaling information included in the INVITE message may be sent by being included in the ISUP message.

The MGCF may send the converted ISUP IAM message to a CS MGW (S48). The CS MGW then may convert the ISUP IAM message into a SETUP message to send to the CSI UE (S49).

Accordingly, the CSI UE may check whether the received SETUP message includes a radio environment capability. If the SETUP message includes the radio environment capability according to the checked result, the CSI UE may include its current radio environment information in a response message (i.e., a CONNECT message) to send to the CS MGW (S50). Here, in the UUS signaling, since contents for the radio environment is included in the SETUP message, the CSI UE may include its radio environment information in the CONNECT message to send to the CS MGW.

The CS MGW may convert the received CONNECT message into the ISUP CON message to sent to a MGCF of the IMS core (S51). The MGCF then may convert the ISUP CON message into a SIP message (S52). The MGCF may send a 200 OK response message with respect to a voice service to the S-CSCF1 (S53). Here, if the ISUP CON message includes radio environment information, the MGCF may map the corresponding information to be suitable for formats defined in [Table 1] and [Table 2]

The S-CSCF1 may forward the received 200 OK response message with respect to the voice service to the CSI AS (S54). The CSI AS may analyze the received 200 OK response message to recognize whether the radio environment of the CSI UE is a MultiRAB/DTM environment, thereby informing the IMS UE of the recognized information. For example, if the radio environment of the CSI UE is not the MultiRAB/DTM environment, the CSI AS may modify the 200 OK response message using a warning message or other appropriate response message code. If the warning message is used, the CSI AS may inform the IMS UE using the warning message that the CSI UE can not simultaneously perform one or more services because it is not under the MultiRAB/DTM environment.

The CSI AS may send the 200 OK response message to the S-CSCF1, with including the warning message or without including the warning message, according to the radio environment of the CSI UE (S56). The S-CSCF1 may forward the 200 OK response message to the S-CSCF2 according to the existing IMS procedure. The S-CSCF2 accordingly may forward the received 200 OK response message to the IMS UE (S57 and S58).

Therefore, if the 200 OK response message does not have the warning message, the IMS UE may consider it as the CSI UE is under the MultiRAB/DTM environment, and accordingly may additionally perform a procedure for initiating a multimedia session (i.e. a process of adding a non-voice multimedia component) (S59 and S60). If the 200 OK response message has the warning message, on the other hand, the IMS UE does not additionally perform the procedure for initiating the multimedia session under a state of the voice service being connected.

Figure 5:
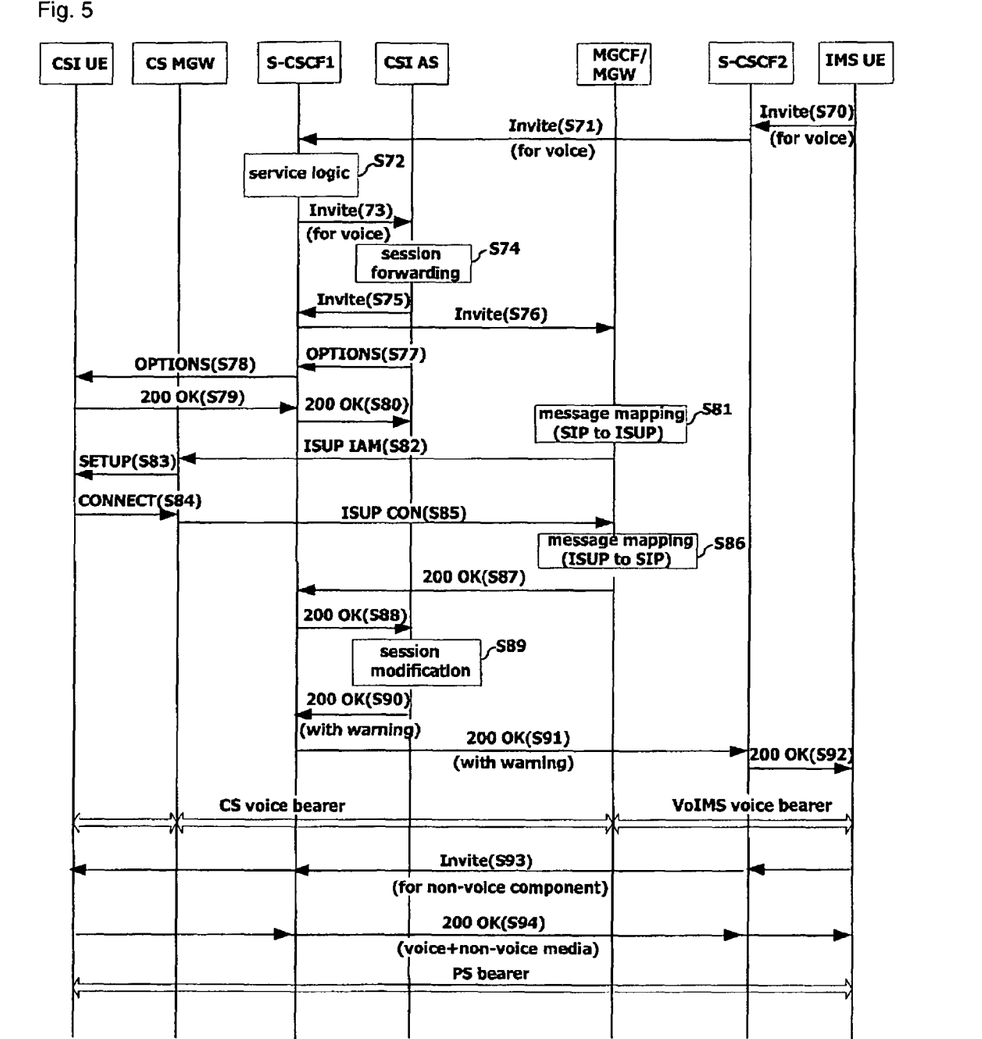
FIG. 5 is a signal flowchart illustrating a second embodiment of a method for transmitting multimedia information in a wireless communication system according to the present invention.

FIG. 5 illustrates a second embodiment of a method for transmitting multimedia information in a wireless communication system according to the present invention, which illustrates a method for recognizing a radio environment of a CSI UE via OPTIONS messages upon setting an IMS service session.

As illustrated in FIG. 5, an IMS UE may send an INVITE message to a S-CSCF2 of an IMS core to which the IMS UE belongs, thereby requesting a session setup for connecting a SIP-based voice service with a CSI UE (i.e., terminating UE) (S70). The S-CSCF2 may forward the INVITE message to a S-CSCF1 of the IMS core to which the CSI UE belongs according to an IMS session setup procedure (S71).

After receiving the INVITE message, the S-CSCF1 may perform a service logic to authenticate the CSI UE (i.e., the terminating UE) (S72), and then may forward the INVITE message to the CSI AS with reference to routing information read from a HSS (not shown) (S73).

After receiving the INVITE message, the CSI AS may forward the corresponding INVITE message to a CS domain (S74~S76), and simultaneously may send an OPTIONS request to an IMS domain of the CSI UE, thereby receiving CSI UE capability (S77).

That is, the CSI AS may forward the INVITE message to the MGCF via the S-CSCF1, and then may send an OPTIONS request message to the S-CSCF1 so as to receive the current capability of the CSI UE as shown in the following [Table 3].

Table 3
[Table 3]

TABLE

OPTIONS tel:+12125552222 SIP/2.0Via: SIP/2.0/UDP [5555::aaa:bbb:ccc:ddd]
:1357;comp=sigcomp;branch=z9hG4bKnashds7Max-Forwards: 70Route:
<sip:pcscf1.visited1.net:7531;1r;comp=sigcomp>,<sip:orig@scscf1.home1.net;1r>P-Preferred-
Identity: <tel:+1-212-555-1111>P-Access-Network-Info:
3GPP-UTRAN-TDD; utran-cell-id-3gpp=234151D0FCE11Privacy: noneFrom:
<sip:user1_public1 @home1.net>; tag=171828To: <tel:+12125552222>Call-ID:
cb03a0s09a2sdfglkj490333Cseq: 127 OPTIONSRequire: sec-agreeProxy-Require:
sec-agreeSecurity-Verify: ipsec-3gpp; q=0.1; alg=hmac-sha-1-96; spi-c=98765432;
spi-s=87654321; port-c=8642; port-s=7531Contact: <sip:[5555::aaa:bbb:ccc:ddd]
:1357;comp=sigcomp>Accept-Contact:
*,+g.3gpp.cs-voice,+g.3gpp.cs-video;explicitAllow: INVITE, ACK, CANCEL, BYE,
PRACK, UPDATE, REFER, MESSAGE, OPTIONSAccept: application/sdp User-
Agent: PMI-0007, REI-01Content-Length: 0

The S-CSCF1 may forward the received OPTIONS request to the CSI UE (S78). The CSI UE then may send to the S-CSC1 a response message (i.e., 200 OK message) with its capability (i.e., radio environment information) with respect to the OPTIONS request (S79). Here, the CSI UE may set its radio environment information to REI-01 or REI-00. The REI-01 may indicate that the CSI UE is under the coverage of the MultiRAB/DTM (i.e., simultaneously supporting PS and CS), while the REI-00 indicates that the CSI UE is not under the coverage of the MultiRAB/DTM (i.e. optionally supporting PS or CS). Also, the information may be forwarded by being added to a header or body of the request or response message.

The following [Table 4] may show a structure of a 200 OK message with respect to the OPTIONS request.

Table 4

[Table 4]

TABLE

SIP/2.0 200 OKVia: SIP/2.0/UDP
pcscf2.visited2.net:5088;comp=sigcomp;branch=z9hG4bK361k21.1, SIP/2.0/UDP
scscf2.home2.net;branch=z9hG4bK764z87.1, SIP/2.0/UDP
icscf2_s.home2.net;branch=z9hG4bK871y12.1, SIP/2.0/UDP
scscf1.home1.net;branch=z9hG4bK332b23.1, SIP/2.0/UDP
pcscf1.visited1.net;branch=z9hG4bK240f34.1, SIP/2.0/UDP [5555::aaa:bbb:ccc:ddd]
:1357;comp=sigcomp;branch=z9hG4bKnashds7Record-Route:
<sip:pcscf2.visited2.net:5088;1r;comp=sigcomp>>, <sip:scscf2.home2.net;1r>,
<sip:scscf1.home1.net;1r>, <sip:pcscf1.visited1.net;1r>Privacy: noneP-
Access-Network-Info: 3GPP-UTRAN-TDD; utran-
cell-id-3gpp=123451D0FCE11From: <sip:user1_public1 @home1.net>;
tag=171828To: <sip:user2_public1 @home2.net>;tag=314159Call-ID:
cb03a0s09a2sdfglkj490333Cseq: 127 OPTIONSContact:
<sip:user2_public1 @home2.net >;+g.3gpp.cs-voice, <tel:+12125552222>Allow:
INVITE, ACK, CANCEL, BYE, PRACK, UPDATE, REFER, MESSAGE, OPTIONS
Server: PMI-0EA2, REI-01Content-Type: application/sdpContent-Length:
(...)v=0o=- 2987933615 2987933617 IN IP6 5555:: eee:fff:aaa:bbbs=-c=IN IP6
5555::eee:fff:aaa:bbbt=0 0m=message 0 TCP/MSRP *a=accept-types:text/plain text/html
message/cpim image/jpeg image/gif video/3gppa=max-size:65536m=video 0
RTP/AVP 96a=rtpmap:96 H263-2000/90000m=audio 0 RTP/AVP 97a=rtpmap:97
AMR/8000

The S-CSCF1 may forward the received 200 OK message to the CSI AS (S80). Here, the CSI AS is currently waiting for the response with respect to an actually requested session. If the response with respect to the actually requested session arrives, the CSI AS may configure radio environment information related to the CSI UE and a 200 OK with respect to the actually requested session.

That is, the MGCF may convert the INVITE message received from the S-CSCF1 into an ISUP IAM message of the CS domain (S81). During this process, each header of the INVITE message may be changed (converts) into a parameter of the ISUP IAM message as shown in [Table 1]. The ISUP IAM message converted by the MGCF may be sent to the CS MGW (S82). The CS MGW then may convert the ISUP JAM message into a SETUP message, to send to the CSI UE (S83).

The CSI UE may send a CONNECT message to the CS MGW in response to the received SETUP message (S84). The CS MGW may convert the received CONNECT message into an ISUP CON message, thereby sending the converted ISUP CON message to the MGCF of the IMS core (S85). The MGCF may recognize whether the CON message includes radio environment related parameter. If the CON message includes the radio environment related parameter, the MGCF may map the corresponding information into a header when converting the CON message into a SIP-based response message. Accordingly, the MGCF may map the received ISUP CON message into a SIP message (S86), and then sends a 200 OK response message to the S-CSCF1 with respect to a voice service (S87). The S-CSF1 then may forward the received 200 OK response message with respect to the voice service to the CSI AS (S88).

Accordingly, the CSI AS may analyze both the 200 OK response message and the previously received 200 OK response message with respect to the OPTIONS request. The CSI AS then may recognize whether the radio environment of the CSI UE is the MultiRAB/DTM environment, thereby informing the IMS UE of the recognition. For example, if the radio environment of the CSI UE is not the MultiRAB/DTM environment, the CSI AS may modify the 200 OK message using a warning message or an appropriate response message code (S89).

If the warning message is used, the CSI AS may inform the IMS UE by using the warning message that the CSI UE can not simultaneously perform one or more services because the CSI UE is not under the MultiRAB/DTM environment.

The CSI AS may send the 200 OK response message to the S-CSCF1, with including the warning message or without including the warning message, according to the radio environment of the CSI UE (S90). The S-CSCF1 may forward the 200 OK response message to the S-CSCF2 according to the existing IMS procedure. The S-CSCF2 accordingly may forward the received 200 OK response message to the IMS UE (S91 and S92).

Therefore, if the 200 OK message does not have the warning message, the IMS UE may consider it as the CSI UE is under the MultiRAB/DTM environment, and accordingly may additionally perform a procedure for initiating a multimedia session (i.e. a process of adding a non-voice multimedia component) (S93 and S94). If the 200 OK response message has the warning message, on the other hand, the IMS UE may not additionally perform the procedure for initiating the multimedia session under a state of the voice service being connected.

The method for exchanging radio environment information between the CSI AS and the CSI UE for a call request (i.e., INVITE message) with the CSI UE requested by the IMS UE may have been explained with reference to FIGS. 4 and 5 of the present invention. However, another embodiment of proceeding a call request with an IMS UE according to a request by a CSI UE may be applicable. Here, the functions of the CSI AS and the MGCF MGW are the same in both FIGS. 4 and 5, namely, the function of the CSI AS for exchanging radio environment information and the function of the MGCF/MGW are the same in FIGS. 4 and 5. Accordingly, the detailed description thereof will be omitted.

As described above, this disclosure can effectively increase satisfaction of multimedia communications and support efficient communications, by forwarding radio environment information related to a CSI terminal to an IMS terminal and simultaneously providing information on further usable terminals between the two terminals.

This disclosure has been explained with reference to the embodiments which are merely exemplary. It will be apparent to those skilled in the art that various modifications and variations can be made in the present invention without departing from the spirit or scope of the invention. Thus, it is intended that this disclosure cover modifications and variations of this disclosure provided they come within the scope of the appended claims and their equivalents.

The invention claimed is:

1. A method for transmitting information in a wireless communication system to perform a combined service between terminals having different communication environments, the method comprising:
receiving, by a CSI (Combined Circuit-Switched and IMS) application server, from an IMS (Instant Messaging Service) terminal incapable of performing communications over a circuit-switched (CS) domain, a request message for a CS call setup with a CSI (Combined Circuit-Switched and IMS) terminal that supports communications over both the CS domain and a packet-switched (PS) domain;
sending, by the application server to the CSI terminal via the CS domain during the CS call setup, a first message including radio environment capability information of the IMS terminal on behalf of the IMS terminal, wherein the application server adds the radio environment capability information of the IMS terminal to a header of the first message;
receiving, by the application server, a second message including a radio environment capability information of the CSI terminal sent by the CSI terminal in response to the first message,
wherein the radio environment capability information of the CSI terminal indicates whether the CS domain and the PS domain are simultaneously supported; and
sending, by the application server, a response message to the IMS terminal.

2. The method of claim 1, wherein the received radio environment capability information of the CSI terminal includes at least one among:
a multiple Radio Access Bearer/Dual Transfer Mode (MultiRAB/DTM);
predetermined IMS service information; and
capability version information of the CSI terminal.

3. The method of claim 1, wherein the first message is a SIP (Session Initiation Protocol) based INVITE message.

4. The method of claim 1, wherein the step of sending the radio environment capability information of the IMS terminal to the CSI terminal comprises:
sending the first message via a MGCF (media gateway control function).

5. The method of claim 1, wherein the response message includes UUS signaling information in a body of a SIP INVITE message, and includes indication information in a header of the SIP INVITE message, the indication information informing the inclusion of the UUS (User-to-User Signaling) information in the body of the SIP INVITE message.

6. A method for transmitting information in a wireless communication system to perform a combined service between terminals having different communication environments, the method comprising:
receiving, by a CSI (Combined Circuit-Switched and Instant Messaging Service) terminal, from an application server, a request message transmitted by the application server according to a request for setting a session from an IMS (Instant Messaging Service) terminal;
checking whether the request message includes radio environment capability information of the IMS terminal; and
transmitting a response message including radio environment capability information of the CSI terminal according to a result from the checking,
wherein the IMS terminal is incapable of performing communications over a circuit-switched (CS) domain, and the CSI terminal supports communications over both the CS domain and a packet-switched (PS) domain,
wherein the radio environment capability information of the CSI terminal indicates whether the CS domain and the PS domain are simultaneously supported,
wherein the radio environment capability information of the IMS terminal is sent to the CSI terminal over the CS domain during a CS call setup by the application server on behalf of the IMS terminal, and
wherein the request message is an INVITE message and the CSI application server adds a radio environment header to the INVITE message to contain the radio environment capability information of the IMS terminal.

7. The method of claim 6, wherein the request message is an INVITE or SETUP message.

8. The method of claim 6, wherein the response message includes UUS signaling information in a body of a SIP INVITE message, and includes indication information in a header of the SIP INVITE message, the indication information informing the inclusion of the UUS (User-to-User Signaling) information in the body of the SIP INVITE message.

9. The method of claim 8, wherein the radio environment capability information of the IMS terminal indicates whether or not the IMS terminal supports MultiRAB/DTM (multiple Radio Access Bearer/Dual Transfer Mode).

10. An application server in a wireless communication system to perform a combined service between terminals having different communication environments, the server comprising:
a transceiver to send and receive signals; and
a processor, cooperating with the transceiver, to:
receive, via the transceiver from an IMS (Instant Messaging Service) terminal that does not perform communications over a circuit-switched (CS) domain, a request message for a CS call setup with a CSI (Combined Circuit-Switched and IMS) terminal that supports communications over both the CS domain and a packet-switched (PS) domain;
send, via the transceiver to the CSI terminal via the CS domain during the CS call setup, a first message including radio environment capability information of the IMS terminal on behalf of the IMS terminal;
receive, via the transceiver, a second message including a radio environment capability information of the CSI terminal sent by the CSI terminal in response to the first message,
wherein the radio environment capability information of the CSI terminal indicates whether the CS domain and the PS domain are simultaneously supported; and
send, via the transceiver, a response message to the IMS terminal,
wherein the received radio environment capability information of the CSI terminal includes at least one among: Multi-RAB/DTM (multiple Radio Access Bearer/Dual Transfer Mode) information; useable IMS service information; and capability version information of the CSI terminal.

11. The application server of claim 10, wherein the application server is a CSI AS (application server) and the request message is a SIP (Session Initiation Protocol) based INVITE message.

12. A Combined Circuit-Switched and Instant Messaging Service (CSI) terminal in a wireless communication system to perform a combined service between terminals having different communication environments, the CSI terminal comprising:
 a transceiver to send and receive signals; and
 a processor, cooperating with the transceiver, to:
  receive, via the transceiver from an application server, a request message transmitted by the application server according to a request for setting a session from an IMS (Instant Messaging Service) terminal;
  check whether the request message includes radio environment capability information of the IMS terminal; and
  transmit, via the transceiver, a response message including radio environment capability information of the CSI terminal according to a result from the checking,
 wherein the IMS terminal is incapable of performing communications over a circuit-switched (CS) domain, and the CSI terminal supports communications over both the CS domain and a packet-switched (PS) domain,
 wherein the radio environment capability information of the CSI terminal indicates whether the CS domain and the PS domain are simultaneously supported,
 wherein the radio environment capability information of the IMS terminal is sent to the CSI terminal over the CS domain during a CS call setup by the application server on behalf of the IMS terminal, and
 wherein the response message includes information to enable the IMS terminal to determine whether a PS session setup with the CSI terminal is to be performed,
 wherein the radio environment capability information of the IMS terminal indicates whether or not the IMS terminal supports Multi-RAB/DTM (multiple Radio Access Bearer/Dual Transfer Mode), and
 wherein the received request message is an INVITE message having a radio environment header added thereto that contains the radio environment capability information of the IMS terminal.

13. The method of claim 6, wherein the radio environment capability information of the CSI terminal includes at least one among:
 a multiple Radio Access Bearer/Dual Transfer Mode (MultiRAB/DTM);
 predetermined IMS service information; and
 capability version information of the CSI terminal.

14. The terminal of claim 12, wherein the radio environment capability information of the CSI terminal includes at least one among:
 a multiple Radio Access Bearer/Dual Transfer Mode (MultiRAB/DTM);
 predetermined IMS service information; and
 capability version information of the CSI terminal.

* * * * *